(12) United States Patent
Huber

(10) Patent No.: US 7,729,079 B1
(45) Date of Patent: Jun. 1, 2010

(54) DISK DRIVE ESTIMATING FLY HEIGHT USING A PLL TUNED BY A FLY HEIGHT CAPACITANCE

(75) Inventor: William D. Huber, Hollister, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 12/356,701

(22) Filed: Jan. 21, 2009

(51) Int. Cl.
  *G11B 21/02* (2006.01)
(52) U.S. Cl. .......................................... 360/75
(58) Field of Classification Search .................. 360/75, 360/31, 42, 46, 49, 67, 68; 369/100; 714/8, 714/799
  See application file for complete search history.

(56) References Cited

U.S. PATENT DOCUMENTS

| | | | | |
|---|---|---|---|---|
| 5,311,287 A | * | 5/1994 | Amer | 356/614 |
| 5,831,733 A | * | 11/1998 | de Groot | 356/369 |
| 5,862,157 A | * | 1/1999 | Bessios | 714/799 |
| 5,918,001 A | * | 6/1999 | Ueno et al. | 714/8 |
| 6,008,640 A | * | 12/1999 | Tan et al. | 324/212 |
| 6,967,670 B2 | * | 11/2005 | Berner et al. | 347/233 |
| 7,164,555 B2 | | 1/2007 | Kato et al. | |
| 7,199,960 B1 | | 4/2007 | Schreck et al. | |
| 7,224,553 B2 | | 5/2007 | Sasaki et al. | |
| 7,394,611 B1 | | 7/2008 | Rahgozar | |
| 7,542,223 B2 | * | 6/2009 | Hashimoto et al. | 360/49 |
| 2006/0126476 A1 | * | 6/2006 | Lacey | 369/100 |
| 2008/0158715 A1 | | 7/2008 | Hirano et al. | |
| 2008/0170316 A1 | * | 7/2008 | Kim | 360/31 |
| 2008/0198497 A1 | | 8/2008 | Lee et al. | |

* cited by examiner

*Primary Examiner*—Fred Tzeng

(57) ABSTRACT

A disk drive is disclosed comprising a disk, a head actuated over the disk, and control circuitry operable to estimate a fly height of the head by tuning a phase locked loop (PLL) in response to a fly height capacitance. In one embodiment, the PLL comprises a resistive component having a second terminal coupled to the fly height capacitance, a variable oscillator operable to generate a first oscillating signal applied to a first terminal of the resistive component to generate a second oscillating signal at the second end of the resistive component, and a phase detector operable to generate a control signal by comparing a phase of the first oscillating signal to a phase of the second oscillating signal. The control signal is applied to the variable oscillator to adjust a frequency of the first oscillating signal.

28 Claims, 5 Drawing Sheets

DISK DRIVE ESTIMATING FLY HEIGHT USING A PLL TUNED BY A FLY HEIGHT CAPACITANCE

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

An air bearing forms between the head and the disk due to the disk rotating at high speeds. It may be desirable to estimate a fly height of the head, for example, when a system controls the fly height in order to optimize the write/read signals. The fly height estimate may be used to select a nominal (open loop) fly height control signal, for example, after detecting the fly height control signal that causes the head to contact the disk. Alternatively, the estimated fly height may be employed as feedback in a closed loop control system which continuously adjusts the control signal in order to maintain a target fly height. Repeatable fly height deviations may also be detected from the estimated fly height, and then compensated using feedforward control.

DETAILED DESCRIPTION OF EMBODIMENTS OF THE INVENTION

Figures 1A, 1B:
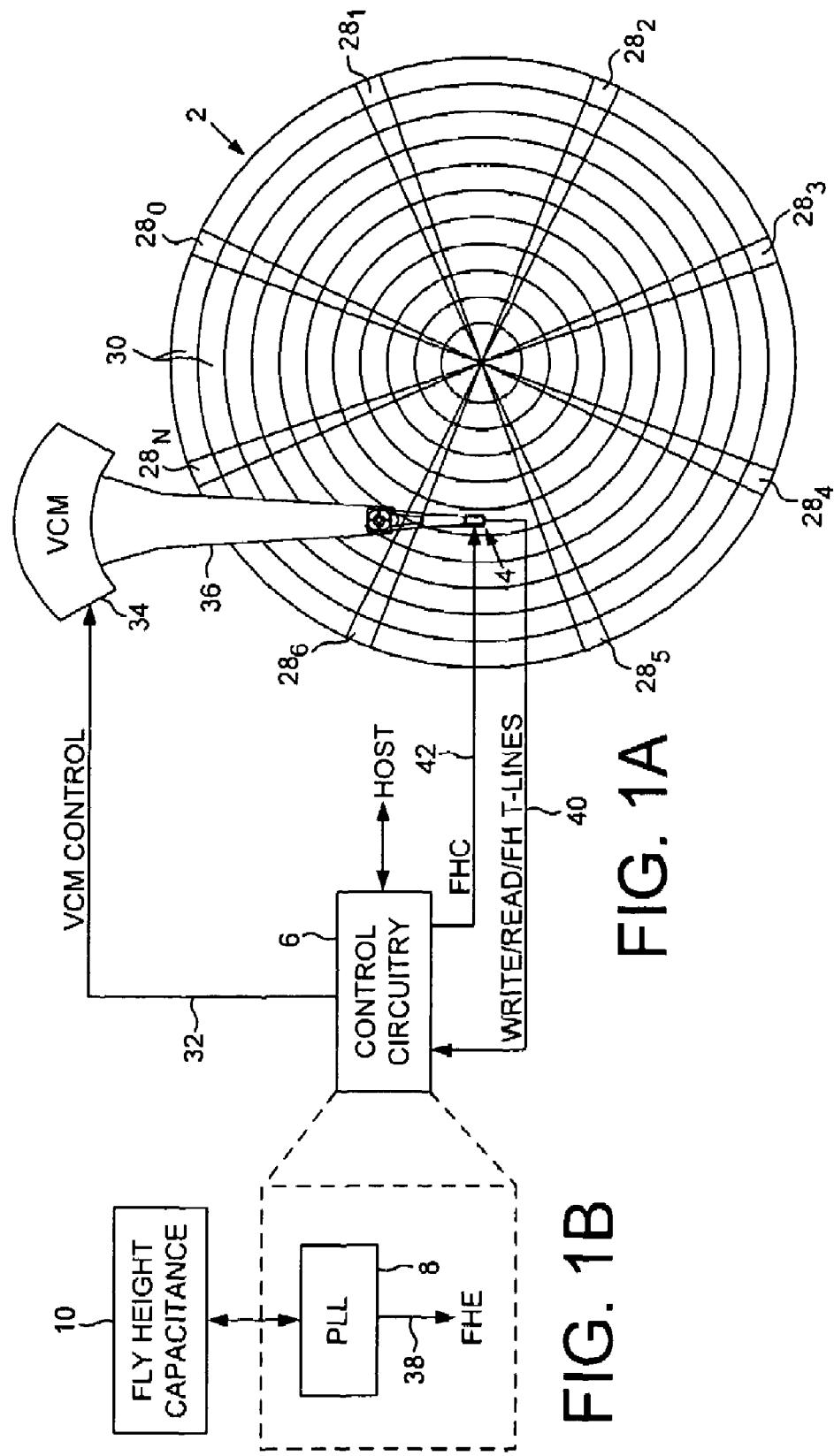
FIG. 1A shows a disk drive according to an embodiment of the present invention comprising a head actuated over a disk, and control circuitry for estimating a fly height of the head.
FIG. 1B shows an embodiment of the present invention wherein a fly height capacitance tunes a phase-locked loop (PLL) in order to estimate the fly height of the head.

FIG. 1A shows a disk drive comprising a disk 2, a head 4 actuated over the disk 2, and control circuitry 6 operable to estimate a fly height of the head 2 by tuning a phase locked loop (PLL) 8 in response to a fly height capacitance 10 (FIG. 1B). In an embodiment shown in FIG. 2A, the PLL comprises a resistive component 12 (a buffer) having a second terminal coupled to the fly height capacitance 10, a variable oscillator 16 operable to generate a first oscillating signal 18 applied to a first terminal of the resistive component 12 to generate a second oscillating signal 20 at the second end of the resistive component 12, and a phase detector 22 operable to generate a control signal 24 by comparing a phase of the first oscillating signal 18 to a phase of the second oscillating signal 20. The control signal 24 is applied to the variable oscillator 16 (through a compensation filter 26) to adjust a frequency of the first oscillating signal 18.

In the embodiment of FIG. 1A, the disk 2 comprises a plurality of embedded servo sectors $28_0$-$28_N$ which define a plurality of tracks 30. Each servo sector 28, comprises head positioning information such as a track address for coarse positioning during seeks, and servo bursts for fine positioning while tracking the centerline of a target track during write/read operations. The control circuitry 6 processes a read signal emanating from the head 4 to demodulate the servo sectors into a position error signal (PES). The PES is filtered with a suitable compensation filter to generate a control signal 32 applied to a VCM 34 which rotates an actuator arm 36 about a pivot in a direction that reduces the PES.

Any suitable head 4 may be employed in the embodiments of the present invention, and in one embodiment, the head comprises a slider with an integrated write element (e.g., an inductive coil) and a read element (e.g., a magnetoresistive element). The slider comprises at least one surface forming a capacitor plate which together with the surface of the disk 2 forms a capacitance that varies inversely with the fly height. If an oscillating signal is applied to the fly height capacitance 10 through a resistive component, the phase change and/or magnitude change of the signal due to the change in capacitance provides an indication of the change in fly height. However, rather than correlate the phase and/or magnitude change of the oscillating signal directly with the fly height estimate, in one embodiment the phase and/or magnitude change is used to tune the PLL 8 of FIG. 1B.

In an embodiment described below with reference to FIG. 7, the head 4 further comprises a suitable fly height actuator (e.g., a heater or a piezoelectric actuator) for actuating the fly height of the head 4 in response to the fly height estimate (FHE) 38. Referring again to FIG. 1A, the write/read lines and fly height transmission lines 40 couple the head 4 to the control circuitry 6 which generates the FHE 38, and in response generates a fly height control (FHC) signal 42 applied to the fly height actuator.

Figure 2A:
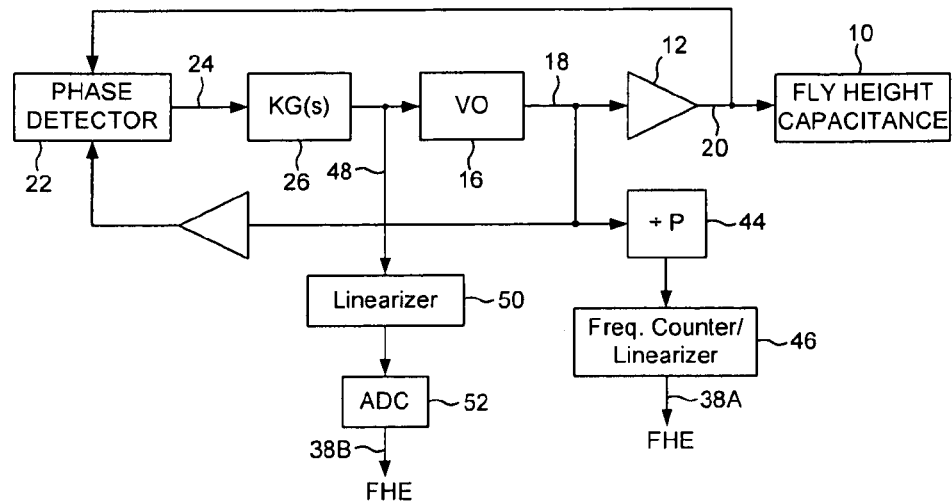
FIG. 2A shows PLL circuitry according to an embodiment of the present invention for estimating the fly height of the head.

In the embodiment of FIG. 2A, the frequency of the oscillator signal 18 may be converted into a fly height estimate 38A by scaling the first oscillating signal 18 with a suitable scalar 44 the output of which clocks a suitable counter and linearizer 46. In another embodiment, the filtered control signal 48 is converted into a fly height estimate 38B using a suitable linearizer 50 (e.g., a piece-wise linearizer), the output of which is converted into a digital signal using an analog-to-digital converter (ADC) 52.

Figure 2B:
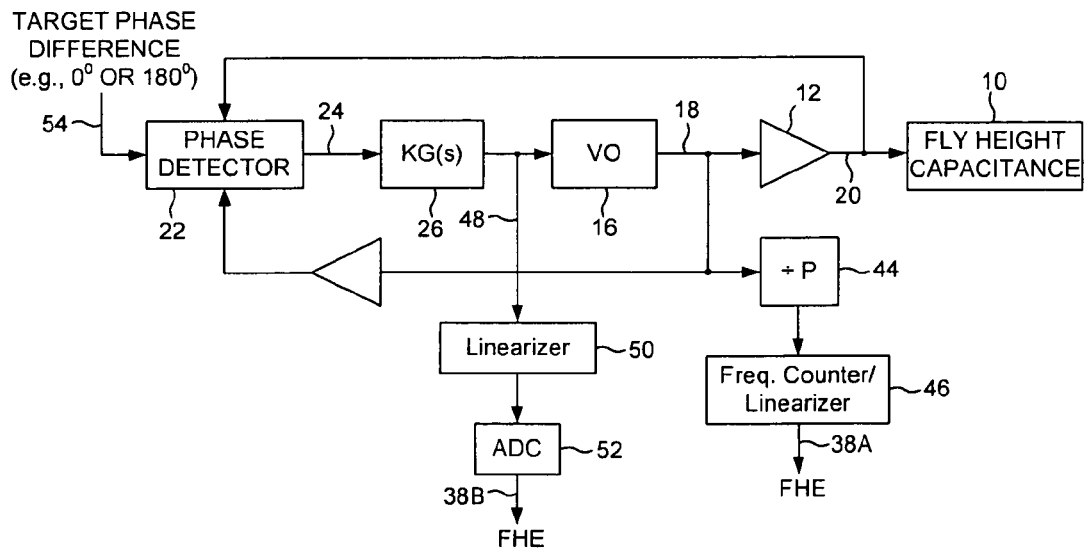
FIG. 2B shows an embodiment of the present invention wherein the PLL operates according to a target phase.

In an embodiment shown in FIG. 2B, the phase detector 22 is programmed with a target phase difference 54. In one embodiment, the target phase difference is selected from the group consisting of zero degrees and 180 degrees. The target phase may be selected relative to the bandwidth of the magnitude response of the PLL, which may vary depending on the embodiment of the PLL employed. The control signal 48 adjusts the frequency of the first oscillating signal 18 to drive the phase difference between the first and second oscillating signals 18 and 20 toward the target phase difference.

Figure 3:
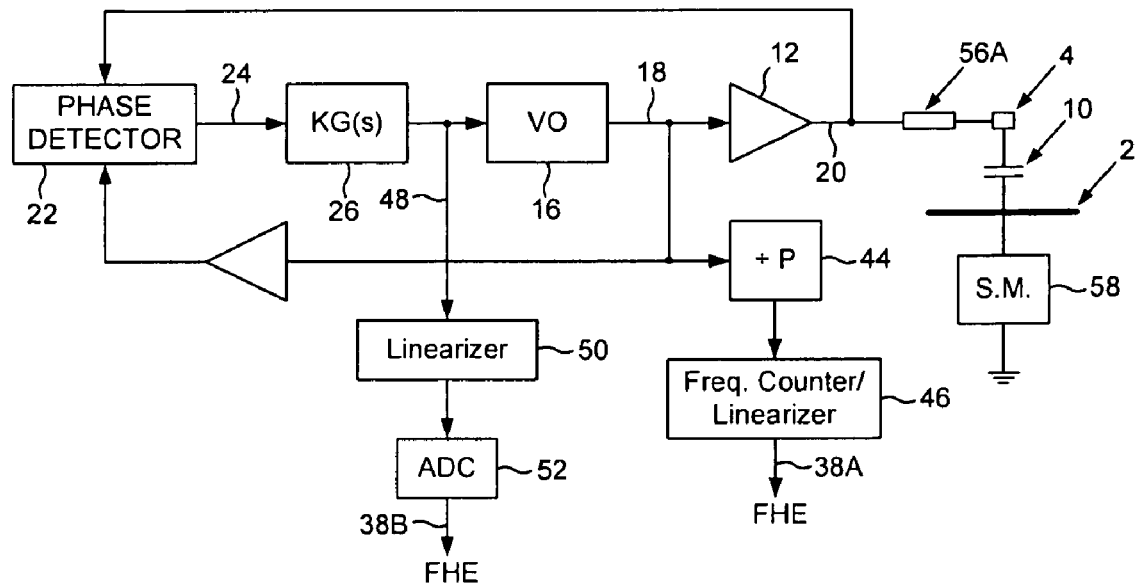
FIG. 3 shows an embodiment of the present invention wherein a first transmission line couples a capacitor plate of the head to a resistive component (a buffer).
Figure 4:
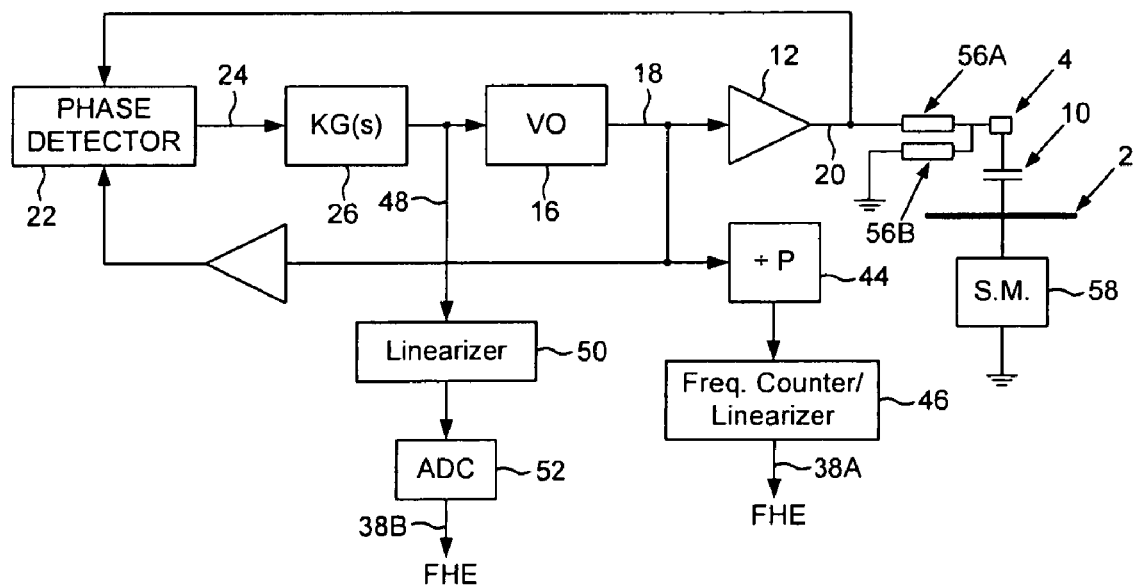
FIG. 4 shows an embodiment of the present invention wherein a second transmission line couples the capacitor plate of the head to ground.

FIG. 3 shows an embodiment of the PLL wherein a first transmission line 56A couples the second terminal of the resistive component 12 to a surface of the head 4, and FIG. 4 shows an embodiment wherein a second transmission line 56B couples the surface of the head 4 to a ground. In one embodiment, the first and second transmission lines 56A and 56B are broadside coupled and stacked traces. The different configurations may provide a more suitable phase and/or magnitude response (e.g., higher bandwidth and/or higher rate of phase change around the target phase difference). In the embodiments of FIG. 3 and FIG. 4, the signal path to ground is through the spindle motor 58 bearings.

Figure 5A:
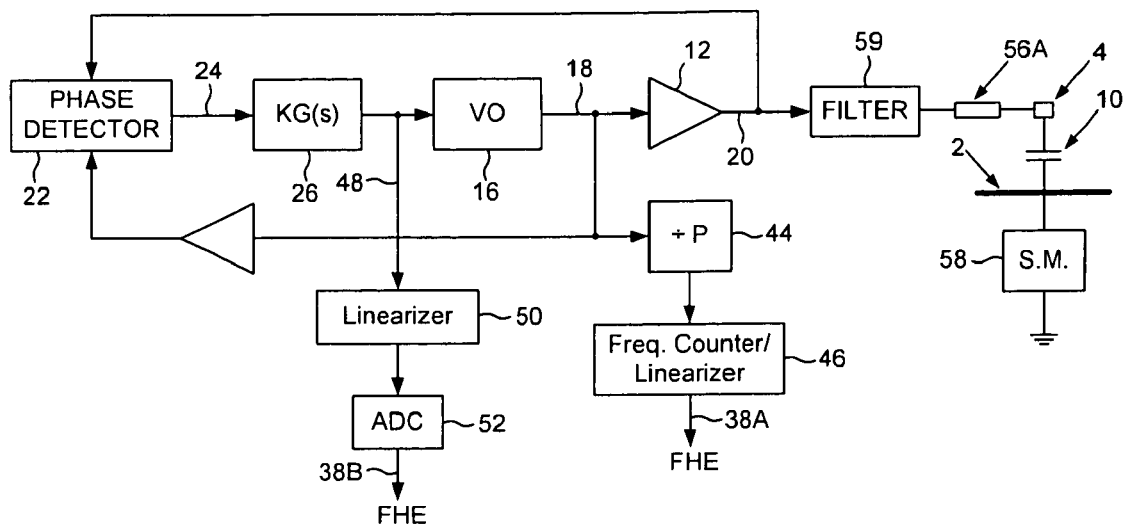
FIG. 5A shows an embodiment wherein a filter is inserted between the resistive component and the head to reduce sensitivity of the fly height estimate to impedance variations in the transmission line(s).
Figure 5B:
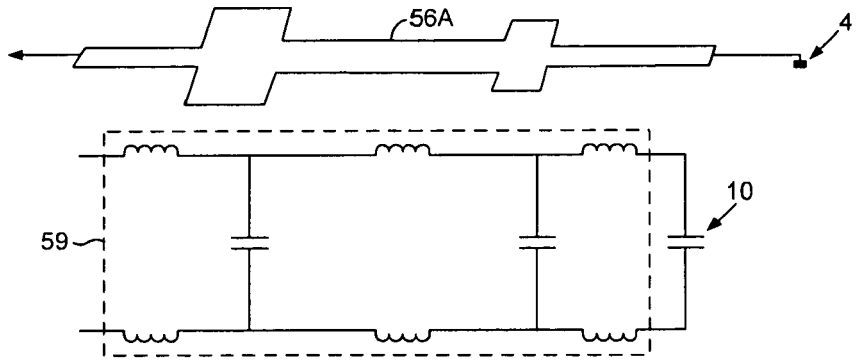
FIGS. 5B and 5C show embodiments wherein the filter is implemented by varying a geometry of the transmission line(s) to form an LC ladder network with the fly height capacitance as the terminating shunt capacitor.
Figure 5C:
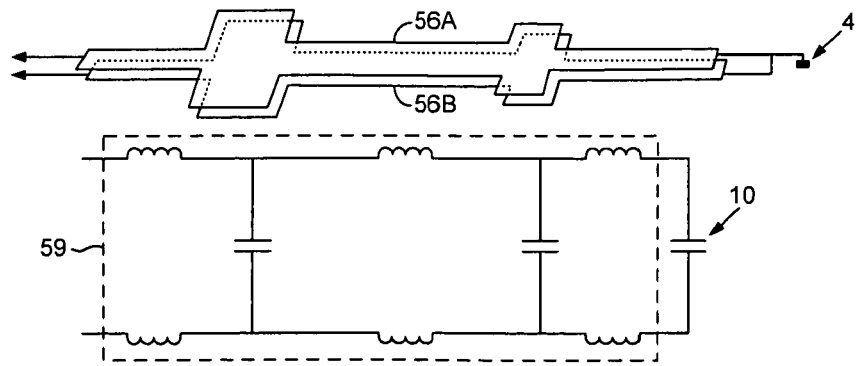

In the embodiments of FIG. 3 and FIG. 4, the impedance of the transmission lines may vary with changes in environmental conditions, such as with changes in temperature, altitude, and/or humidity. These impedance changes may affect the phase and/or magnitude response of the second oscillating signal 20, thereby inducing an error in the FHE 38A or 38B. In one embodiment, changes in environmental conditions may be detected and the FHE adjusted accordingly. In another embodiment shown in FIG. 5A, a filter 59 is inserted into the transmission path which may help desensitize the FHE 38 to changes in impedance along the transmission lines so that the FHE is affected mainly by changes in the fly height capacitance. Any suitable filter 59 may be employed (e.g., a low pass filter) and the filter 59 may be inserted at any suitable location along the transmission path. In addition, the filter 59 may be implemented using any suitable circuitry, such as with lumped elements (resistors, capacitors, and inductors). Alternatively, or in addition to the lumped elements, the filter 59 may be implemented by adjusting the geometry of the transmission lines along the transmission path, such as by varying the width of the transmission lines or the distance separating the transmission lines (i.e., stepped transmission lines). In one embodiment, the transmission lines are stepped so as to implement an LC ladder network with the fly height capacitance as the terminating shunt capacitance as shown in the embodiments of FIGS. 5B and 5C.

Figure 6:
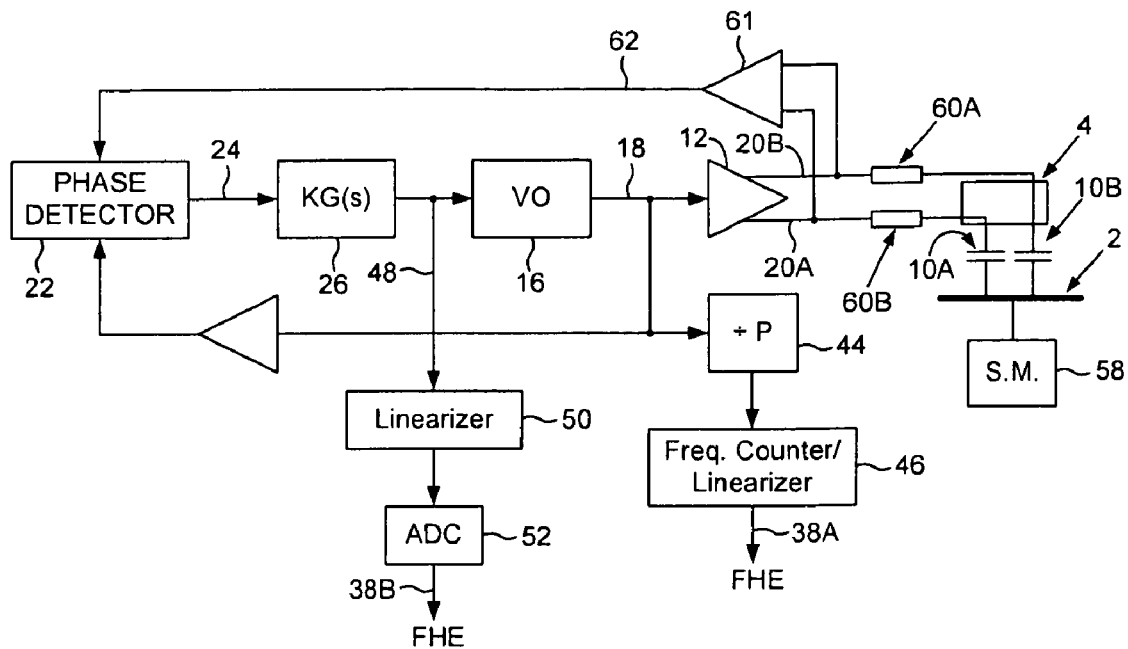
FIG. 6 shows an embodiment of the present invention wherein the fly height capacitance comprises two capacitors formed by two capacitor plates in the head.

In an alternative embodiment shown in FIG. 6, the signal path is implemented as a differential signal through a pair of capacitors 10A and 10B which are formed by a pair of capacitor plates on the surface of the slider together with the capacitor plate formed by the surface of the disk. The buffer 12 generates a differential source signal 20A and 20B applied to first and second transmission lines 60A and 60B which are coupled to the respective slider capacitor plates of capacitors 10A and 10B. A second buffer 61 converts the differential source signal 20A and 20B into the feedback signal 62 applied to the phase comparator 22. This embodiment eliminates the signal path to ground through the spindle motor 58 bearings.

Figure 7:
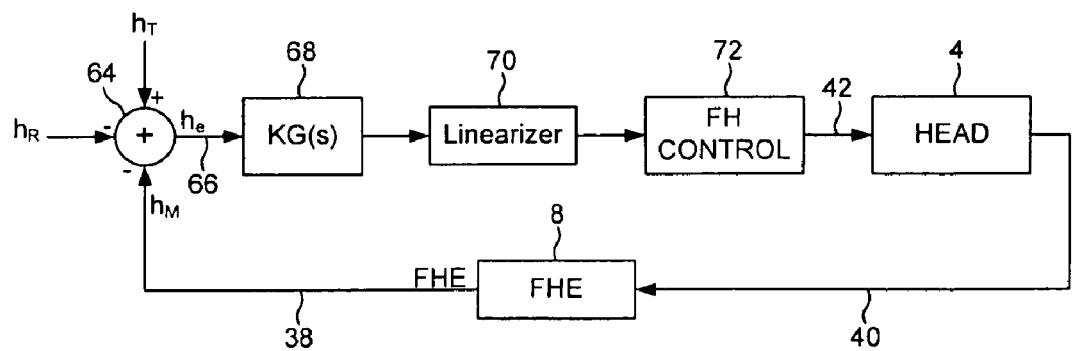
FIG. 7 shows control circuitry according to an embodiment of the present invention for adjusting the fly height of the head in response to the fly height estimate.

FIG. 7 shows control circuitry according to an embodiment of the present invention for adjusting the fly height of the head in response to the fly height estimate. A touch down control signal $h_T$ is calibrated to determine the control signal that will cause the head to touch the surface of the disk. A reference control signal $h_R$ is then subtracted 64 from the touch down control signal $h_T$ to establish a target fly height. The fly height estimate (FHE) 38 $h_M$ is subtracted 64 from the target fly height to generate a control signal error $h_e$ 66. The control signal error $h_e$ 66 is filtered using a suitable compensator 68, the output of which is linearized 70 and then applied to a suitable fly height controller 72. The fly height controller 72 generates the fly height control signal 42 applied to the fly height actuator integrated with the head 4 in order to adjust the fly height of the head in a direction that reduces the control signal error $h_e$ 66.

The embodiment of FIG. 2A employs a phase detector 22 for detecting a phase difference between the first oscillating signal 18 and the second oscillating signal 20 to tune the PLL 8 and generate the FHE 38. In an alternative embodiment, a magnitude detector may be employed for detecting a magnitude difference between the first oscillating signal 18 and the second oscillating signal 20 to tune the PLL 8 and generate the FHE 38. In yet another embodiment, a combination of phase and magnitude detection may be employed in order to tune the PLL 8 and generate the FHE 38.

Any suitable oscillating signal 18 may be generated by the VCO 16 of FIG. 2A, such as a sinusoidal signal or square wave signal. In one embodiment, the frequency of the oscillating signal 18 (fundamental frequency) is selected to minimize crosstalk with the write/read signals. For example, in one embodiment the frequency of the oscillating signal 18 is selected slightly higher than fifty percent of the highest data rate in the write/read signals.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;
   a head actuated over the disk; and
   control circuitry operable to estimate a fly height of the head by tuning a phase locked loop (PLL) in response to a fly height capacitance.

2. The disk drive as recited in claim 1, wherein the PLL comprises:

a resistive component comprising a first terminal and a second terminal, wherein the second terminal is coupled to the fly height capacitance;

a variable oscillator operable to generate a first oscillating signal applied to the first terminal of the resistive component to generate a second oscillating signal at the second end of the resistive component; and a phase detector operable to generate a control signal by comparing a phase of the first oscillating signal to a phase of the second oscillating signal, wherein the control signal is applied to the variable oscillator to adjust a frequency of the first oscillating signal.

3. The disk drive as recited in claim 2, wherein the control signal adjusts the frequency of the first oscillating signal to maintain a target phase difference between the phase of the first oscillating signal and the phase of the second oscillating signal.

4. The disk drive as recited in claim 3, wherein the target phase difference is selected from the group consisting of zero degrees and 180 degrees.

5. The disk drive as recited in claim 2, wherein the control circuitry is further operable to convert the frequency of the oscillator signal into the estimate of the fly height.

6. The disk drive as recited in claim 2, wherein the control circuitry is further operable to convert the control signal into the estimate of the fly height.

7. The disk drive as recited in claim 2, further comprising a first transmission line coupling the second terminal of the resistive component to a surface of the head.

8. The disk drive as recited in claim 7, further comprising a second transmission line coupling the surface of the head to a ground.

9. The disk drive as recited in claim 7, further comprising a filter inserted between the second terminal and the surface of the head along a transmission path of the transmission line.

10. The disk drive as recited in claim 9, wherein the filter is implemented by varying a geometry of the first transmission line.

11. The disk drive as recited in claim 2, wherein:
the head comprises a first and second capacitor plates; and
the fly height capacitance comprises a first capacitance formed between the first capacitor plate and the disk and a second capacitance formed between the second capacitor place and the disk.

12. The disk drive as recited in claim 11, further comprising:
a first transmission line coupling the second terminal of the resistive component to the first capacitor plate; and
a second transmission line coupling a third terminal of the resistive component to the second capacitor plate.

13. The disk drive as recited in claim 1, wherein the fly height capacitance comprises a capacitance formed between a surface of the head and a surface of the disk.

14. The disk drive as recited in claim 1, further comprising:
an actuator operable to adjust the fly height of the head;
a comparator operable to compare the estimate of the fly height to a target fly height to generate a fly height error; and
a fly height controller operable to generate a control signal applied to the actuator in response to the fly height error.

15. A method of estimating a fly height of a head over a disk in a disk drive, the method comprising tuning a phase locked loop (PLL) in response to a fly height capacitance.

16. The method as recited in claim 15, wherein the PLL comprises a resistive component comprising a first terminal and a second terminal, wherein the second terminal is coupled to the fly height capacitance, the method further comprising:
generating a first oscillating signal applied to the first terminal of the resistive component to generate a second oscillating signal at the second end of the resistive component;
generating a control signal by comparing a phase of the first oscillating signal to a phase of the second oscillating signal; and
adjusting a frequency of the first oscillating signal in response to the control signal.

17. The method as recited in claim 16, wherein the frequency of the first oscillating signal is adjusted to maintain a target phase difference between the phase of the first oscillating signal and the phase of the second oscillating signal.

18. The method as recited in claim 17, wherein the target phase difference is selected from the group consisting of zero degrees and 180 degrees.

19. The method as recited in claim 16, further comprising converting the frequency of the oscillator signal into the estimate of the fly height.

20. The method as recited in claim 16, further comprising converting the control signal into the estimate of the fly height.

21. The method as recited in claim 16, wherein a first transmission line couples the second terminal of the resistive component to a surface of the head.

22. The method as recited in claim 21, wherein a second transmission line couples the surface of the head to a ground.

23. The method as recited in claim 21, further comprising filtering the second oscillating signal to reduce a sensitivity of the fly height estimate to impedance variations in the first transmission line.

24. The method as recited in claim 23, wherein the filter is implemented by varying a geometry of the first transmission line.

25. The method as recited in claim 16, wherein:
the head comprises a first and second capacitor plates; and
the fly height capacitance comprises a first capacitance formed between the first capacitor plate and the disk and a second capacitance formed between the second capacitor place and the disk.

26. The method as recited in claim 25, wherein:
a first transmission line couples the second terminal of the resistive component to the first capacitor plate; and
a second transmission line couples a third terminal of the resistive component to the second capacitor plate.

27. The method as recited in claim 15, wherein the fly height capacitance comprises a capacitance formed between a surface of the head and a surface of the disk.

28. The method as recited in claim 15, further comprising:
comparing the estimate of the fly height to a target fly height to generate a fly height error; and
adjusting the fly height of the head in response to the fly height error.

* * * * *